United States Patent Office 3,441,062
Patented Apr. 29, 1969

3,441,062
AIR-CUSHIONED BUMPER
Chester R. Messer, Concord, N.H., assignor to Page Belting Company, Concord, N.H., a corporation of New Hampshire
Filed Sept. 20, 1967, Ser. No. 669,206
Int. Cl. D03d 49/40, 49/38
U.S. Cl. 139—166                                    1 Claim

ABSTRACT OF THE DISCLOSURE

A coiled air-cushioned bumper comprising resilient nylon strip material coiled to present an outer overlapping turn stiffened in an area of impact, and an inner turn separated from the outer turn in part by a segmental air space.

---

This invention comprises a new and improved loomside bumper constructed and arranged to bring the picker stick to its final stop after it has been partially checked in its stroke by the usual check strap control mechanism.

Bumpers of this type are subjected to severe and destructive battering by the picker stick which not only tends mechanically to break down the structure of the bumper but heats it sufficiently to destroy adhesive bond of its components.

An object of the present invention is to provide a bumper that will arrest the motion of the picker stick in two-stage cushion fashion and at the same time generate a cooling blast of air within or about the bumper.

A bumper of the type described has been found to obviate the defects noted as incident to bumpers heretofore known and to possess the advantage of longer service life. It is also conducive to smoother action in the loom and may be produced at moderate cost of manufacture. The bumper of my invention comprises one or more resilient strips of woven nylon material coiled to present an overlapping outer turn with which the picker stick first makes contact and an inner turn separated from the outer turn in part by an air space which is contracted by the initial contact of the picker stick with the outer turn and expanded resiliently when permitted to do so thereby drawing a cooling blast of air into the interior of the bumper. The two-stage action of the bumper is brought about by the preliminary contraction or displacement of the outer turn followed by increased resistance when the outer turn has been displaced sufficiently to engage the inner turn.

These and other features of the invention will be best understood and appreciated from the following description of preferred embodiments thereof selected for purposes of illustration and shown in the accompanying drawings in which—

Figure 1:
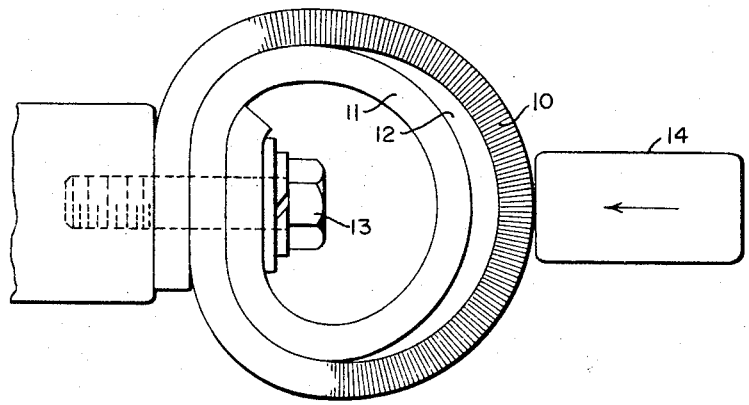
Figure 2:
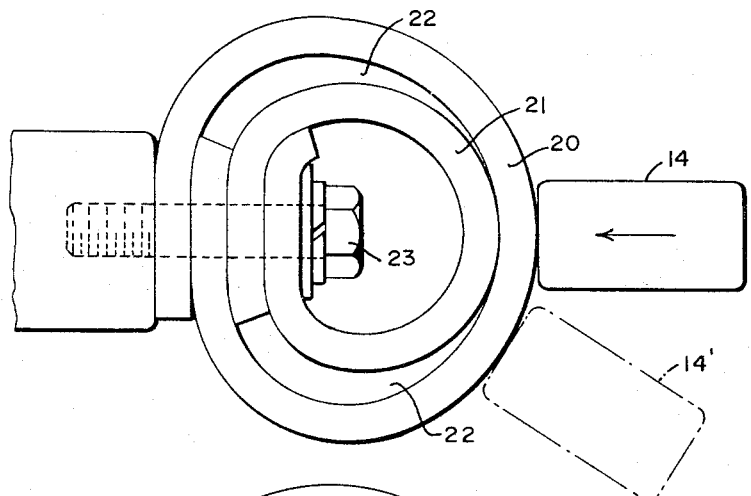
Figure 3:
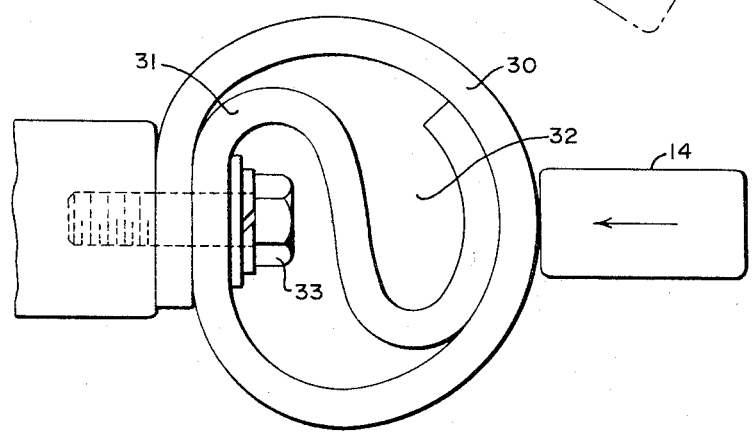

FIGS. 1, 2 and 3 are views in elevation illustrating three modifications of the bumper of my invention.

As shown in FIG. 1 the bumper comprises a single strip of resilient woven nylon or other synthetic resinous compound which in itself tends to maintain its coiled shape as shown and return thereto upon removal of distorting pressure of the picker stick. The strip is coiled to present an outer overlapping turn 10 and an inner turn 11 of smaller diameter so that it is separated from the outer turn by a segmental air space 12. The ends of the two turns are overlapped and clamped by a single bolt 13 which is also utilized to mount the bumper at the loomside in proper alignment with the stroke of the picker stick 14. With this construction it will be seen that initial contact of the picker stick tends to flatten and collapse the outer turn 10 of the bumper with initial cushion action which continues until the outer turn is brought into contact with the inner turn 11 whereupon the second stage cushion action comes into effect. Meanwhile the segmental air space 12 is contracted and expanded generating a cooling blast of air. The nylon strip is preferably impregnated with polyurethane throughout its length and receives a secondary increased stiffening impregnation in the area shaded in FIG. 1 which is located in the vicinity of picker stick contact. This area of contact is therefore stiffened against bending under impact of the picker stick while the side portions of the loop are more flexible and so adapted for freer bending in generating air flow.

The bumper of FIG. 2 comprises two strips of woven nylon coiled to present an outer turn 20 and an inner turn 21 separated by segmental air spaces 22 and secured with overlapping ends by a single bolt 23.

The bumper shown in FIG. 3 comprises a single strip of woven nylon coiled to present an outer turn 30 and an inner S-shaped turn 31 which defines with the outer turn segmental air spaces 32. A portion of the inner turn 31 overlaps the end of the outer turn 30 and is secured in position by a clamping bolt 33.

While polyurethane has been referred to for convenience as an impregnant it will be understood that any synthetic resin having similar characteristics may be employed as a full equivalent, such for example as polyamides, vinyl copolymers, vinyl acetate and the like. The area of double impregnation in the strap is identified by an intense blue color.

It is to be noted that the precise location of the segmental air space is a matter of secondary importance so long as it is arranged to be either contracted or expanded by the impact of the picker stick.

Also it has been found advantageous in some cases to mount the bumper as a whole so that the picker stick 14' encounters its outer turn with a glancing blow, rather than squarely in the direction of the bolt. As suggested in FIG. 2, a glancing blow of the picker stick 14' then causes a rolling retarding action of the bumper in addition to that resulting from its deformation.

Having thus disclosed my invention what I claim as new and desire to secure by Letters Patent is:

1. A coiled air-cushioned bumper comprising woven nylon strip material coiled to present an outer overlapping turn and an inner turn separated from the outer turn in part by a segmental air space, and a single clamping bolt penetrating adjacent portions of both turns, the outer overlapping turn being stiffened by impregnation of polyurethane in the area of picker stick contact, while the side portions of the turn remain more flexible for bending in generating air flow through the bumper.

References Cited

UNITED STATES PATENTS

| 482,977 | 9/1892 | Hamilton | 139—166 |
| 2,262,255 | 11/1941 | Sargent | 139—166 X |
| 2,521,893 | 9/1950 | Bridges | 139—166 |
| 2,760,526 | 8/1956 | Hussey | 139—166 |
| 3,004,563 | 10/1961 | Williamson | 139—166 |
| 3,228,429 | 1/1966 | Messer | 139—161 |

FOREIGN PATENTS

| 799,916 | 8/1958 | Great Britain. |
| 1,017,725 | 1/1966 | Great Britain. |
| 335,001 | 2/1959 | Switzerland. |

JAMES KEE CHI, *Primary Examiner.*